April 26, 1932.  H. F. BAKEWELL  1,855,174

POWER APPLICATION AND CONTROL MEANS

Filed Nov. 3, 1930    4 Sheets-Sheet 1

Inventor:
Harding F. Bakewell,
By
Attorney.

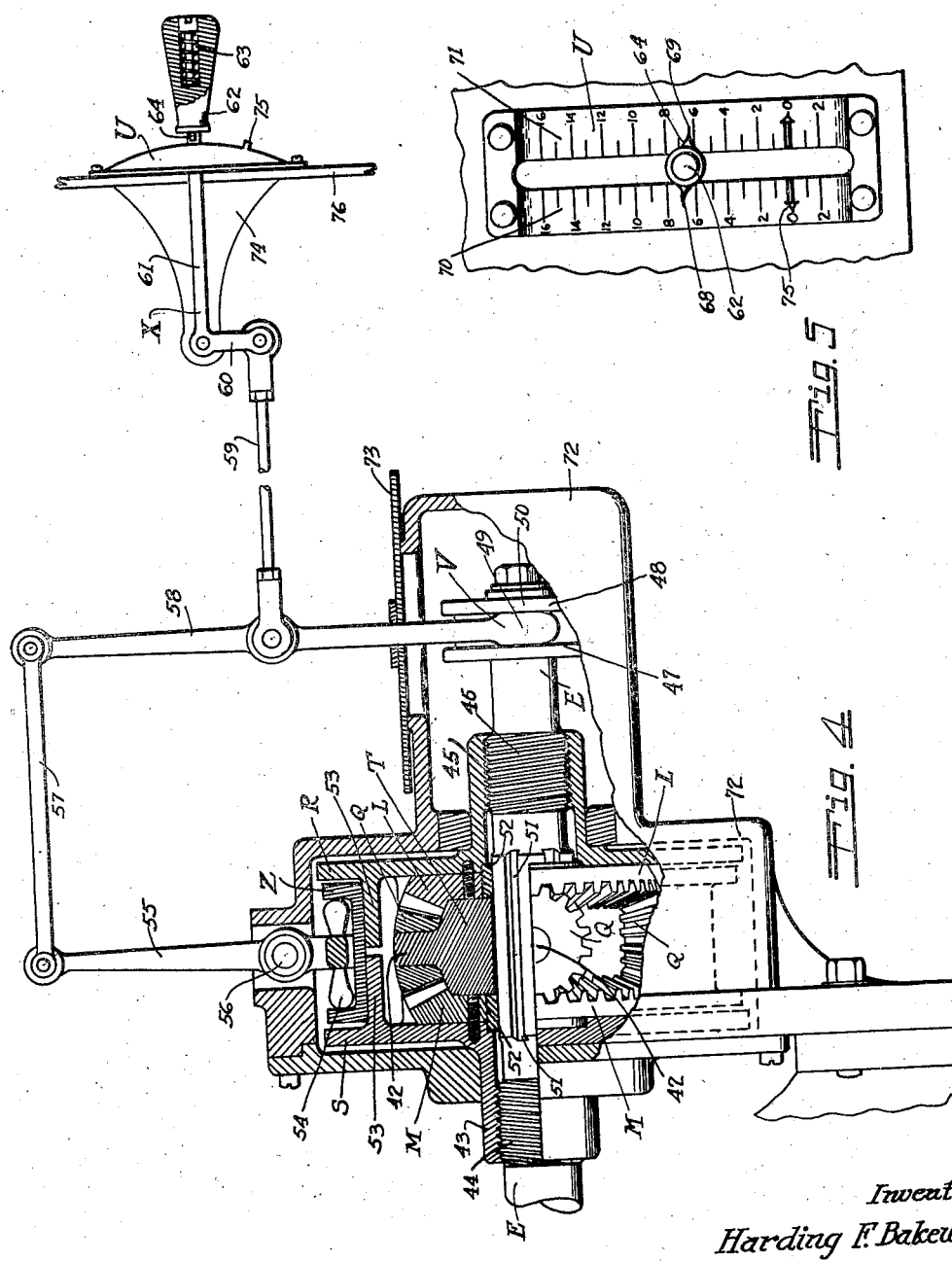

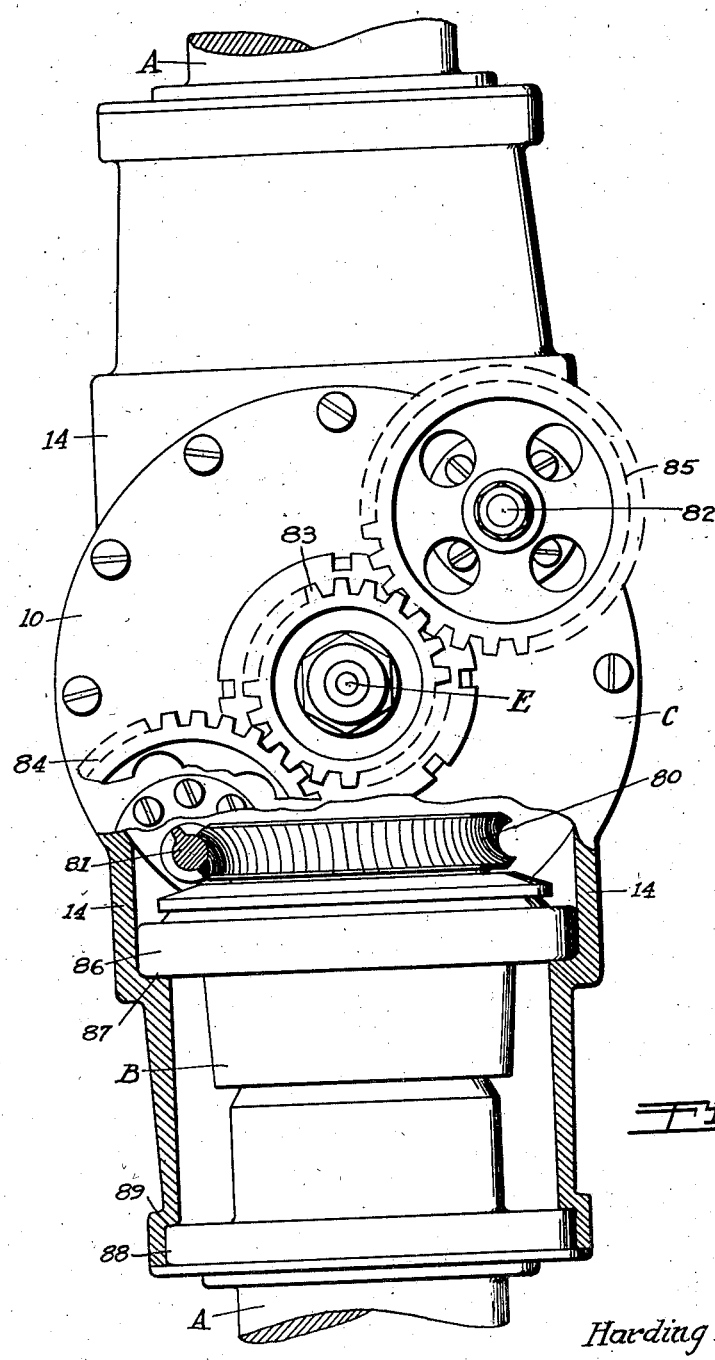

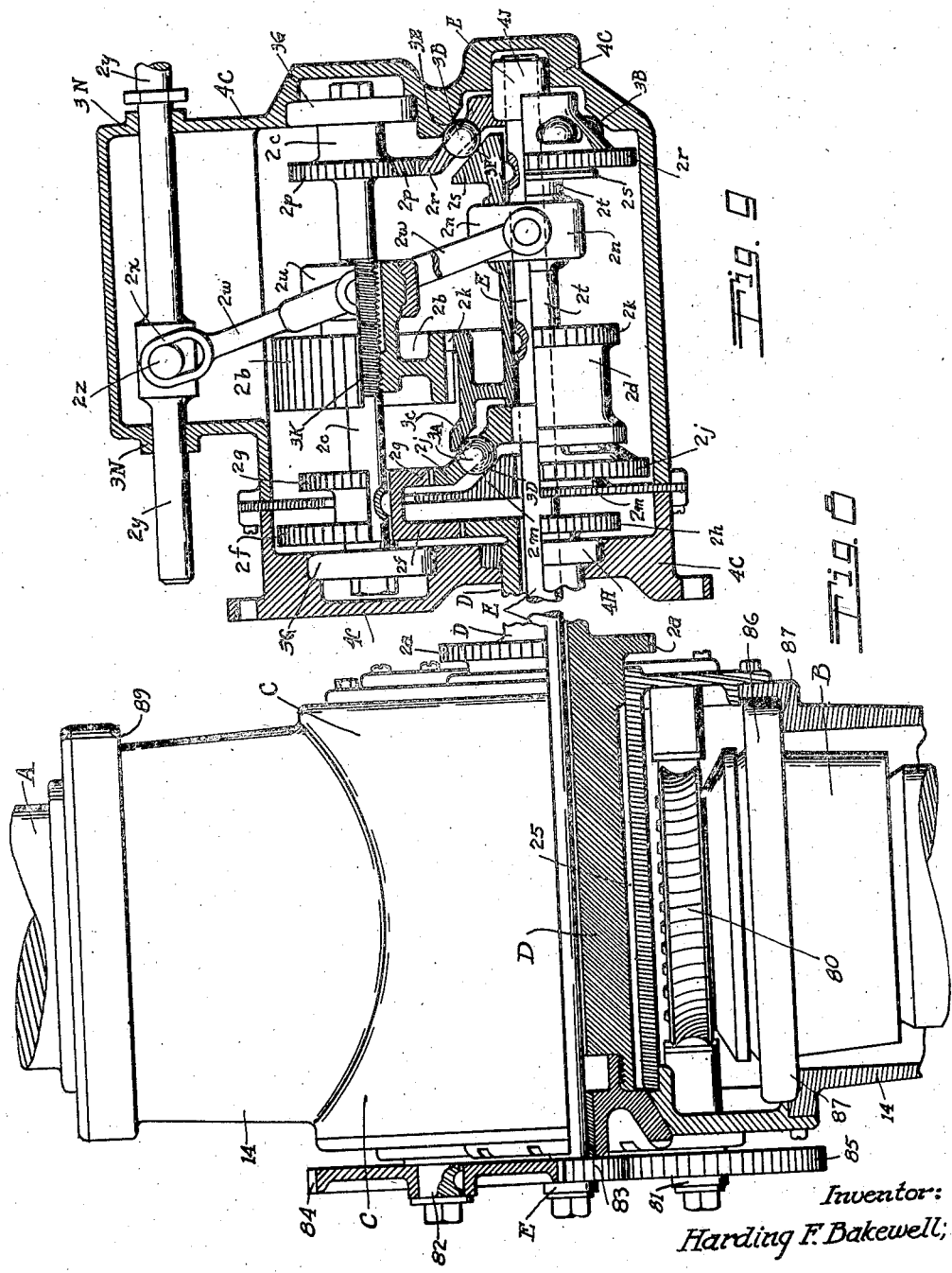

Patented Apr. 26, 1932

1,855,174

UNITED STATES PATENT OFFICE

HARDING F. BAKEWELL, OF LOS ANGELES, CALIFORNIA

POWER APPLICATION AND CONTROL MEANS

Application filed November 3, 1930. Serial No. 493,034.

This invention relates to improvements in control means for propellers and more especially for air-craft propellers, and sensitive power actuating means for control of propeller blade pitch and for other devices.

The objects of the invention are: To provide means for changing the pitch of propeller blades, to provide manually controlled power appliances for operating the pitch changing means; the manual control whereof is operated from a convenient position within reach of the operator's normal location; provide a hollow power shaft for driving the propeller; to transmit the power for blade pitch changes to the pitch changing means through the hollow power drive shaft; to produce manually controlled devices which will always be in readiness to operate and which will be power driven, the operation continuing only as long as the operator continues to press on the control handle or lever, and which will instantly stop when the operator ceases to exert pressure on the control; to provide an indicator for the said power driven devices which will show, at any time, the position of the controlling member or shaft thereof, which indicator will show the blade pitch of the propeller when said controlling member is connected with the blade pitch-changing means; and to provide devices for the accomplishment of these several objects, which will be simple, reliable, of light-weight and low in cost.

Applicant is aware that power driven mechanisms for changing the pitch of propeller blades have been devices, which, in general, comprise either a system of gearing or an electric motor, in both cases the units being controlled either through electric wiring and switches and/or positive positioned manuals which lack the sensitiveness of the controls disclosed in this invention, suitable for actuating pitch-changing means and also useful for many other purposes requiring sensitive power control.

In the drawings:

Fig. 4 is a side elevation, partly in section and partly broken away, showing the power driving mechanism and manual control thereof for moving the inner shaft, which movement changes the pitch of the propeller blades.

Fig. 5 is a front view of the control lever handle and the pitch indicator for showing the blade pitch of the propellers.

Fig. 7 is an end view, partly in section, and partly broken away, drawn to an enlarged scale, of a housing carrying fragments of two propeller blades and illustrating another means for changing the blade pitch.

Fig. 8 is a longitudinal view of same, partly in section, also drawn to an enlarged scale.

Fig. 9 is a longitudinal view, partly in section, of a mechanism for operating the blade pitch change means shown in Figs. 7 and 8.

Figure 1:
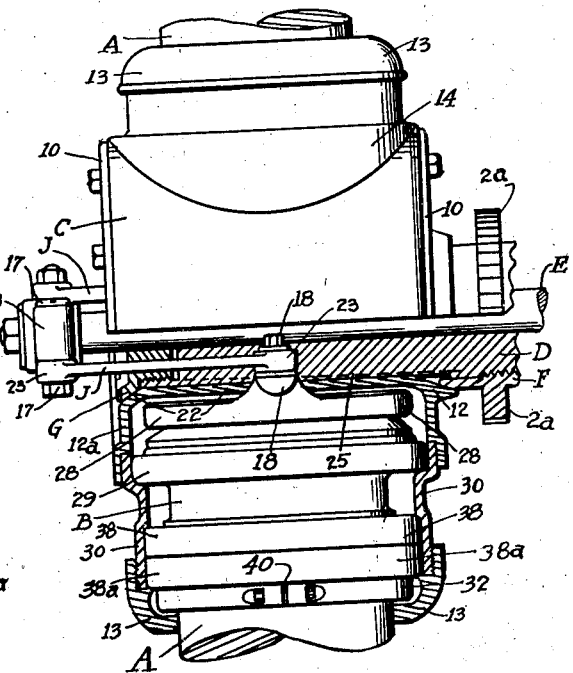
Fig. 1 is a longitudinal view, partly in section, of the two inner ends of the propeller blades and a supporting housing, with a fragmentary view of the propeller shaft with parts for turning the propeller blades around their axes, to shift their pitch.
Figure 2:
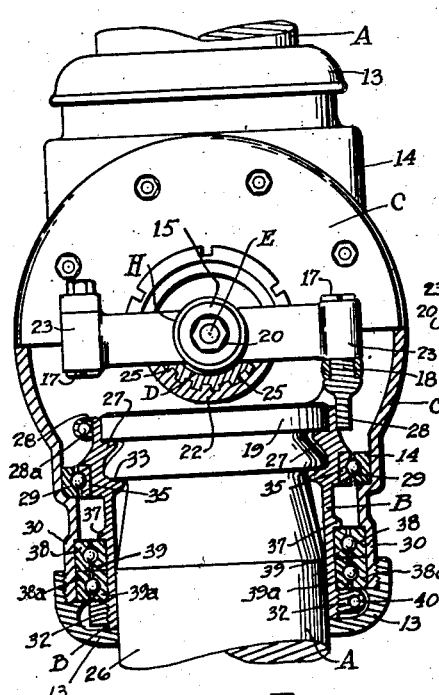
Fig. 2 is an end view of same, partly in section.
Figure 3:
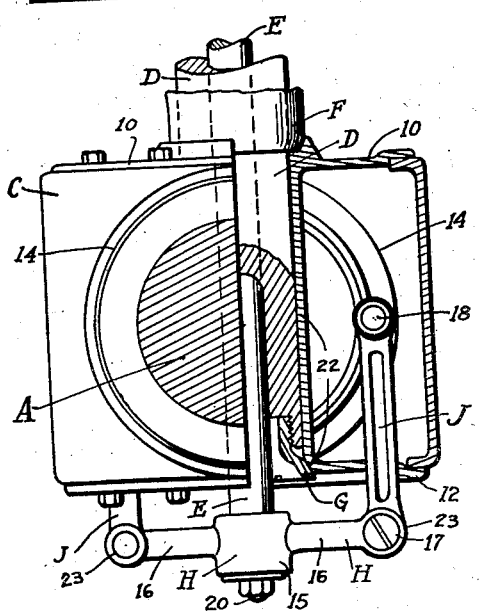
Fig. 3 is a plan view of same, a portion whereof is broken away to show the main drive shaft and the interior, blade-shifting shaft.

Referrings to Figs. 1, 2 and 3, "A" is the stub, or inner, end of a propeller blade, whereof there are usually two, at 180 degrees to each other, or having substantially coincident longitudinal axes, as indicated in Figs. 1 and 2, for each propeller drive. These blade ends are fastened in a housing "C" having two cylindrical portions, "14", on opposite diameters of housing "C", which portions project from the housing periphery and are concentric with the stub ends of the blades. Appropriate holding means retain the blade ends in these portions of the housing, as indicated. Housing "C" is attached to shaft "D", the two being splined together, as shown at "25", so that shaft and housing are constrained to rotate together, thereby sweeping the propeller blades around in their normal plane of revolution and propulsion.

End "A" of each blade, is surrounded by a split sleeve "B", which has the inner and outer peripheral configurations depicted and made by varying the radii along its length, its inner shape being adapted to fit, or cooperate with, the form of the blade-end "A".

The stub, or inner, blade-end, "A", is firmly held by the split sleeve "B". The exterior periphery of sleeve "B" is shaped and fitted to cooperate with certain holding and bearing rings, which latter are preferably ball bearing races, the cooperating outer races being fitted in the outer shell, "14", of housing "C" which has an appropriate configuration to hold them so that the sleeves "B", with the blade-ends "A" fixed therein, can turn freely about the axes of the sleeves "B", thus varying the pitch of the propeller blades.

In the illustrative example shown, end "A" is provided with a metal socket into which the wooden blade end is fitted and firmly fastened. This socket has an integral exterior shoulder "19", which fits into sleeve "B" and contacts with correspondingly shouldered portions "27" of the inner periphery of sleeve "B". Adjacent flange "19" the metal sockets has another integral portion tapered outwardly to form a shoulder, which, likewise, fits into an appropriately shaped, shouldered recess in the inner periphery of sleeve "B", the two cooperating shoulders mating at "33", as shown.

The blade-end socket "A", is then tapered outwardly until its diameter fits the bore of sleeve "B", the two being in cylindrical contact along a sufficient axial length of the two members to provide an adequate bearing for the blade-end in the sleeve. By this construction, the sleeve "B" is securely held on the blade-end "A" and able to resist cantilever forces in any direction and it is locked against centrifugal force by the cooperating shoulders before described.

Housing extension "14" is arranged to encircle the ball-bearing races and hold sleeve "B" against cantilever and centrifugal forces, but to permit its rotation as shown. In this illustrative design, the inner periphery of housing "C" is shouldered inwardly near the inner end to receive ball race "29", which cooperates with ball race "35" on sleeve "B". Housing extension "14" is dimensioned near the outer end to receive ball races "38" and "38a", the cooperating races "39" and "39a" surrounding sleeve "B" as shown. Ball race "39" is held axially by a shoulder "37" on sleeve "B", while race "39a" is adapted to be locked by ring "32" as shown. Ring "32" is provided with a pair of adjacent, radially projecting, flanges having bolt holes and a clamping bolt therethrough and a radial cut through the ring between the flanges, as indicated at "40". The parts are arranged for easy assembly by placing the ball races "35", "39" and "39a" shoulder ring "32", and turning-ring "28" in their proper positions around the halves of sleeve "B", which several rings hold the two parts of "B" firmly together.

Ring "28" surrounds flange "19" and is drawn tightly around it by the pair of radially projecting flanges having a bolt therethrough, the ring being cut through between the flanges and thus forming a clamping means, as shown at "28a", and similar to clamping means "40" of ring "32". A boss, "18" is formed on one side of the ring "28" which is shouldered to form a bearing pin, as shown. Normally, this pin "18" is angularly disposed on ring "28", 90 degrees from the centre line of the shafts "D" and "E", so that a force moving along a line parallel with the shafts "D" and "E" and pressing against pin "18", will cause rotation of the ring about its centre and therewith, rotation of the attached parts, including the stub ends "A" of the propeller blades.

Shaft "E", playing axially in hollow shaft "D", passes through the housing "C", and at its outermost end has affixed a cross-head "H" which comprises a hub "15" through which the shouldered end of shaft "E" passes, the member "H" being fastened in place by nut "20" screwed on the end of shaft "E", and from which two limbs "16" extend diametrally across housing diameter, the two limbs extending in opposite directions. Each limb "16" terminates in an eye or bearing, "23", having its axis parallel to that of the sleeve "B". A connecting pin, "17", is fitted in the bearing "23". An eye bar, or connecting rod, "J", having a journal at each end is connected to each end of cross-head "H" by the pin "17", one eye-bar being placed on one side of the cross-head, the other eye-bar being placed on the opposite side. This arrangement is merely for convenience in assembly.

The free end of each eye-bar is connected to the pin "18" on the annulus "28". Obviously, longitudinal motion of the shaft "E" relative to the power shaft "D", which latter revolves the propeller, will cause rotation of the propeller blades about their axes, this changing the propeller pitch. Since one blade is moved by a force applied on one side of its axis, and the other blade is moved by a force applied on the opposite side, the two forces acting in the same direction, it is clear that the rotation of the blades will be in opposite directions, which is an essential condition for two oppositely positioned propeller blades.

A preferred form of mechanism for causing longitudinal movement of inner shaft "E" in one direction or the other, is shown in Fig. 4. Shaft "E" is continuous from the yoke fulcrum "V" through the housing "C".

(Figs. 1, 2 and 3.) The diameter of shaft "E" is increased along the length between threaded portion "44" and similarly threaded portion "46", threads "44" being left-hand and "46" being right-hand threads. Intermediate said threaded portions, shaft "E" is splined, as indicated at "51". Member "T", similarly splined and constrained to rotate with shaft "E", has a plurality of radial extensions "42" reduced to cylindrical form, and on each of which a pinion "Q" is free to turn, there being four such projections carrying pinions, shown in this particular design.

Meshing with the pinions "Q" are two gears, "L" and "M", which turn on rings "52". These rings are splined and are only to provide a smooth cylindrical surface for the gears "L" and "M" to turn on freely. Since the shaft "E" is to travel longitudinally, the splines "51" must be longer than the axial length of member "T".

Attached to gears "L" and "M" respectively, are clutch plates "R" and "S", or, if convenient, the plates and gears may be integral. Inwardly projecting annuli, or flanges, "53", are formed on the inner faces of the clutch-plates, as shown.

Sleeves "43" and "45" surround threaded shaft portions "44" and "46" respectively, each being threaded similarly to the shaft threading. These sleeves "43" and "45" may be attached to, or integral with, their respective clutch-plates "R" and "S".

Member "Z" is a circular channel surrounding the cylindrical surface formed by the two inner flanges "53" of the clutch-plates, and member "54" is a clutch-member or shoe, connected with the end of link "55", below its fulcrum "56", and positioned between the flanges of member "Z".

Horizontal link "57" is connected at one end to the end of link "55" above its fulcrum "56", the opposite end of link "57" being connected to a second vertical link "58". The lower end of link "58" is formed into yoke "49" working between flanges "47" and "48" on the end of shaft "E". Connected to link "58", intermediate its ends, is link "59", the other end whereof is connected with shorter arm "60" of bell-crank "X", which arm, in this instance, is approximately parallel with links "55" and "58". The end of the longer arm, "61", of bell-crank "X", is provided with an operating handle, "62". Attached to handle "62" is a small member, "64", which has two functions, one as an indicator to show on two cooperating scales the exact degree of pitch change of the propeller blades with respect to some arbitrary datum, the other to act as a stop and prevent further movement of the shaft "E" and propeller blade rotation, which stop position, however, may be passed when desired. The oppositely projecting ends "68" and "69" of member "64" are sharpened to form pointers, as shown (Fig. 5), each passing over its scale "70" and "71" respectively. Projecting from the face of scale-front "U", at the stop point, is stop "75" against which member "64" is stopped when motion has proceeded far enough to bring said members in contact.

Handle "62" is provided with compression spring "63" in a central hollowed space, as shown, the spring pushing handle "62" inward to some limiting point. By pulling the handle "62" outward, axially, it, and attached member "64", may be drawn away from the scale surface "U" a sufficient distance to enable stop "64" to pass over stop "75". Members "74" and "76" are supports for the bell-crank "X" and scale "U".

The mechanism attached to or operating with rotating shaft "E" is preferably enclosed by a housing "72" supported in any convenient manner, and having a movable cover "73" through which link "58" passes. This cover "73" fits closely around link "58" and moves to the right or left with the link. The operation of this system is as follows:

When there is no longitudinal movement of pitch-control shaft "E", and it is rotating at the same speed as that of the propeller power shaft, it turns with it all of the members and parts included between sleeve "43" and flange "48" at this same speed, except shoe "54", ring "Z" and lever yoke "49".

If the propeller blades are to be twisted to change the pitch in such direction that pitch-control shaft "E" must move longitudinally towards the right, handle "62" is depressed downwardly. This causes shoe "54" to move towards the right and press channel annulus "Z" also to the right against clutch disc "R". Sufficient pressure will stop rotation of "R", and with it, gear "L", thereby enabling the moving pinions "Q" to turn gear "M" at twice the angular velocity of that of shaft "E", or if the pressure on handle "62" be less than that required to stop rotation of clutch-plate "R" and its attached gear "L", but sufficient to reduce the speed of the latter, rotation of gear "M" at a higher speed than shaft "E" will result, the speed whereof will depend on the reduction in speed of gear "L" and, therefore, on the pressure applied to handle "62". In any case, the speed of clutch-plate sleeve "45" will diminish while that of sleeve "43" will increase, and there will be relative rotation between shaft "E" and both sleeves "43" and "45".

Assuming that the shaft is running in a counter-clock wise direction, viewed from the end at "50", reduction in speed of sleeve "45" is the equivalent of turning the shaft in the sleeve "45" to screw it out of the sleeve, so that the shaft "E" will be drawn towards the right by this action. Simultaneously, the speed of sleeve "43" being higher than that of shaft "E", the relative rotation between sleeve and shaft is in a direction opposite to that for sleeve "45" and shaft "E". Threads "44" being opposite to threads "46", the effect of higher speed of sleeve "43" is also to move the shaft to the right, so that the two threaded sleeves act simultaneously to cause motion of the shaft. Hence, for this specific design, the relative rotation between shaft "E" and sleeve "43" must be the same as that between the shaft and sleeve "45", or, in other words, the decrease in speed of gear "L" must equal the increase in speed of gear "M", a condition of operation which will automatically adjust itself for any pressure exerted on the handle "62" and transmitted to shoe "54" through the linkage before described.

Obviously, the speed of longitudinal motion of shaft "E" may be sensitively fixed by the operator and the manual pressure he may impose on the control handle.

Longitudinal movement of shaft "E" to the right will cause similar movement of cross-head "H" and the ends of the eye-bars "J" thereto attached, which, in turn, will produce rotation of the turn rings "28" and the sleeves "B" clamped therein, which rotates the propeller blades, "A", thereby changing the pitch.

The reverse of the operation described will take place if the operating handle "62" be pressed upward causing shoe "54" to move leftward, reducing or stopping motion of clutch-plate "S" and gear "M", and producing leftward longitudinal motion of shaft "E".

It is clear that longitudinal motion of the shaft "E" will cause an equal change in the position of lower end of lever "58", which, in turn, will cause movement of handle "62" up or down, by movement of the lever "61", through its connection with lever "58" by bell-crank arm "60" and connecting link "59". Hence, pulling down or pushing up on handle "62" will cause motion of shaft "E" to change the pitch of the propeller blades and the coincident change in the position of the handle "62" and of the pointers "68" and "69" thereto attached. Scales "70" and "71" are identical in the location of their divisions, but the respective cooperating pointers "68" and "69" are relatively displaced. This difference in position of the pointers is to compensate for the initial movement of handle "62" and attached pointers, necessary to cause beginning of shaft motion. Shoe "54" and clamping ring "Z" must each be moved through a short distance before contact of ring "Z" with plate "R" is made. This distance, multiplied by the several lever arms between the pointers "68" and "69" and the shoe "54", is the distance of displacement between pointers "68" and "69" measured along the scales "U". It is obvious that other compensating arrangements can be substituted for this one, if any other is found to be simpler.

Figure 6:
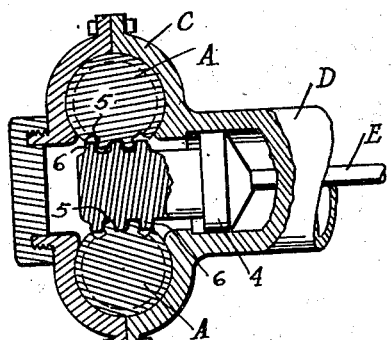
Fig. 6 is a longitudinal section through a propeller housing showing the ends of the propeller blades and the means for changing the blade pitch, by turning the blades about their axes; this being a variant of the apparatus shown in Figs. 1, 2 and 3.

While the mechanism shown in Figs. 1, 2 and 3 is a preferred form of device for turning the propeller blades around their longitudinal axes, responsive to longitudinal motion of a control shaft, as "E", it is obvious that other mechanisms may be used for the same purpose. Fig. 6 is illustrative of one simple variant. "C" is the housing into which the stub ends "A", "A" of the propeller blades are rotatably secured. Housing "C" is attached to, or integral with, main power shaft, "D". Attached to stub ends "A", "A", are sectors or toothed elements "5", "5", cooperating with a double sided rack having teeth "6", "6", as shown. Shaft "E" is attached to the rack, there being an enlarged portion or flange "4" having a diameter to fit the bore of hollow shaft "D" adjacent its connection with housing "C", and thereby forming a guide and support for rack "6", "6". Longitudinal movement of shaft "E", moving rack "6", "6", will rotate the blade-ends "A", "A", in opposite directions.

This device requires that the axes of the blades be displaced in a plane perpendicular to the axes, as indicated.

Instead of turning the propeller blades by means of a power driven reciprocating shaft, and manually controlled, pitch changing can be effected by a rotating shaft. In Figs. 7 and 8, devices are shown which change the propeller pitch by a rotating shaft.

"A", "A" are the propeller blade ends, mounted in a rotating housing or drive-head "C" having oppositely projecting socket portions "14", "14". The blade-ends "A", "A" are rotatably fastened into the sockets "14", "14", so that they are held securely against both centrifugal and cantilever forces. Each end, "A", is surrounded by a sleeve "B", into which the blade is firmly and rigidly fixed. Adjacent the inner end of sleeve "B" is a collar "86", which fits the bore of socket "14". The socket diameter is reduced immediately adjacent the collar "86", providing a shoulder "87" whereby the collar resists the centrifugal thrust. Adjacent the end of socket "14", a second collar "88", is fastened on the sleeve "B", the socket being counterbored to receive the collar and provide a shoulder "89" against which collar "88" works, the two collars and the shouldered portions of the socket, providing secure holding means for the propeller blades which permit axial rotation but which resist any axial motion in either direction.

Of course, the arrangement for holding blade end "A" and sleeve "B" in socket "14", shown in Figs. 1, 2 and 3, may be substituted for the structure just described, or any preferred simple and reliable arrangement of the parts may be adopted.

At the inner end of each blade "A", is fastened a worm-wheel "80", and mating therewith is a worm on a worm-shaft, the lower left-hand one whereof being numbered "81" while the identical worm in the upper right-hand position, is numbered "82".

Each worm shaft, "81" and "82", has a spur gear, "84" and "85", respectively, mounted on it, both of which gears mesh with central gear "83". Rotation of gear "83" turns both worms "81" and "82" causing rotation of worm-wheel "80" and the similar one on the opposite propeller blade end. The worms and worm wheels are threaded and toothed to produce opposite rotation of the two propeller blades when the worm shafts turn in the same direction.

Main drive propeller shaft "D" is fastened to the housing "C" in any approved manner, as by splining shaft "D" into the hub of the housing or drive-head, indicated at "25" in Figs. 1, 2 and 8, or other suitable manner.

Gear wheel "2a" represents the power-receiving element which turns main shaft "D" and drives the propellers. This is merely an indicator, several methods of conveying power to shaft "D" being suitable. However, since they form no part of this invention, the several preferred methods of driving shaft "D" are not here shown or described. Power gear "2a" indicates that power is applied to the main shaft "D" intermediate the propeller blade housing, or drive-head, and the control means whereby the propeller-blades are twisted to change the pitch thereof, such as shown in Figs. 4 and 9, which latter shows one preferred sensitive, power-driven mechanism.

A main, hollow, power-shaft, "D", extends from propeller housing "C" through the power source, as "2a", to the control mechanism, as shown. Inside hollow shaft "D" and concentric therewith, is blade pitch-control shaft "E", which likewise extends from housing "C" to the control mechanism. These two shafts normally rotate at identical speeds and when the speeds are the same, central gear "83" does not rotate and the thereto geared mechanism is quiescent. In order to turn the worm-wheels "80" and "82", and thereby vary the propeller pitch, shaft "E" must turn at a higher or lower angular velocity than that of the main drive shaft "D" and the propeller housing "C", that is, there must be relative rotatory motion between drive-shaft "D" and the pitch-changing shaft, "E".

Mounted in frame "4C" are the several parts of the control mechanism, as shown. Main power shaft "D" passes through journal "4H" at the left-hand end of the frame "4C" and terminates just inside the frame with a sufficient length to accommodate spur gear "2h". Shaft "E" passes through the end of shaft "D" and continues to the right end of the frame where it is journalled at "4J".

Mounted on shaft "E" successively from left to right are: a dished, geared, multiple-ball retainer "2j", free to turn on the shaft; a sleeve "2t", keyed to the shaft and on which sleeve are, successively—a drum "2d" having the left end cone shaped and a narrow ring of gear teeth "2k" at the right end projecting beyond the drum periphery; a free-turning yoke bearing "2n", and a cone-shaped member "2s" having its base towards the left. All of these parts are fastened to or integral with the sleeve "2t" so they turn with shaft "E", excepting yoke bearing "2n" which is free. The final member mounted on shaft "E" is a second geared, multiple-ball spacer, which is free to turn on shaft "E", and identical with the first one "2j".

Concentric with shaft "E", attached to the frame "4C" and fixed in position, are two cones, cone "2m" being adjacent the left end and cone "3E" adjacent the right end of the frame "4C". Hardened steel balls "3A" are placed in the openings in cone-shaped ball-retainer "2j", and (as usual, they are equally spaced around the retainer. The balls "3A" are held on each side of retainer "2j" by contact at "3D" against fixed cone "2m" on one side and by contact at "3C" on the opposite side against rotating cone, on drum "2d". In the other ball retainer, "2r", is a set of steel balls, "3B", identical with balls "3A", which contact with fixed cone "3E" on one side and with rotating cone "2s" on the other side of the retainer, at "3F".

Yoke bearing "2n" cannot slide longitudinally on sleeve "2t" and axial pressure in either direction is communicated to one or the other set of steel balls, "3A" or "3B".

A lay shaft "2c" parallel to shaft "E" and supported in two bearings "3G" at each end, is mounted in the frame "4C". Keyed thereon are gears "2f" and "2g" whereof the former meshes with gear "2h" and the second meshes with the gear teeth of dished spacer "2j". The gears "2h" and "2f" are of the same size, so that shaft "2c" rotates continuously at the same speed as that of main drive shaft "D" and in an opposite direction thereto. Gear "2g" turns ball-retainer "2j", in the same direction as that of shaft "E", and, since gear "2g" is half the diameter of the tooth-pitch circle on retainer "2j", the latter turns at half the speed of shaft "D".

A portion of the length of shaft "2c" is threaded as shown at "3K". A gear "2b" having a wide face and tapped along a portion of its hub is mounted on shaft "2c" and positioned along some portion of threads "3K" as shown. The hub bore is relieved over a considerable part of its length, and the gear is supported only at the threaded portion of the hub. Attached to the exterior of the hub of gear "2b" is a yoke or free running bearing "2u", shouldered to transmit longitudinal thrust to shaft "2c". The teeth on wide gear "2b" mesh with the narrow band of teeth "2k" on drum "2d", the pitch diameter of both sets of teeth being the same, so that their angular velocities are necessarily always equal.

Adjacent the right hand end of shaft "2c" is keyed gear wheel "2p" which meshes with the ball-retainer "2r" and drives the latter. Retainer "2r" is twice the diameter of gear "2p" at the pitch-line. Hence, retainer "2r", like retainer "2j", turns at half the speed of shaft "2c" or of shaft "D". A lever "2w" is pivotally connected at one end to thrust yoke or bearing "2n", similarly connected to thrust bearing "2u" intermediate its ends, and at the outer free end, has an oval eye "2x". A sliding bar "2y", mounted in two bearings "3N" has a pin "2z" projecting from its side and fitted to play in oval eye "2x".

The operation of this device is as follows: Pressure is applied to one end of bar "2y", say from left to right, thereby urging the upper end of lever "2w" in that same direction, by reason of the pressure of pin "2z" against the inner wall of the oval "2x". This force causes one in a similar direction at the thrust bearing "2u" and force in an opposite direction at thrust bearing "2n". The latter force presses steel balls "3A" tightly between fixed cone "2m" and the turning cone "3c" on drum "2d". The balls "3A" are being continuously driven around by geared retainer "2j" between the two cones, the ball centers moving at half the speed of shaft "D". When the balls, "3A", are compressed between fixed cone "2m" and rotating cone "3c", they act as transmission gears, driving cone "3c" by contact with it and the fixed cone. If the lines of contact of the balls with both cones were at equal distances from the centre of rotation, i. e., the centre of shaft "E", then cone "3C" would run at twice the speed of the geared ball-retainer, just as in the case of any pinion driven around a circular path by a member on which it rotates, and meshing with a fixed gear and another free to rotate, in which arrangement the second gear will turn at twice the speed of the pinion centre, as is well known.

Since for the specific gearing adopted in this design, the driver travels at half the speed of normal rotation of shaft "D", the cone "3C" would be driven at the speed of shaft "D", if the contact line for the balls on the fixed cone "2m" were at the same radius as that of the contact line on the rotating cone "3C." But the radius of contact on fixed cone "2m" is less than that on the rotating cone "3C," hence the speed of the latter will be less than that of the shaft "D", when axial pressure is sufficient to produce a ball friction drive.

In general, the speed of the rotating cone (neglecting slip) is $$S = \frac{s \times 2R}{r}$$

in which S is the speed of the rotating cone; s the speed of the ball retainer; r is the radius of the line of contact between balls and rotating cone, and R is the similar radius for the fixed cone. When the two radii are equal, and R equals r, then the speed of the rotating cone, or S, equals $$\frac{s \times 2R}{R}$$

which reduces to 2s, that is, as before explained, the speed of the rotating cone becomes twice that of the ball-retainer.

By adjusting the slope of the cones and other conditions of design, the difference between the radius on the fixed cone around which the balls travel and that of the rotating cone, may be given any practical value desired; so that any rate of speed difference may be obtained. For instance, if the radius of the contact circle on the rotating cone be 10 percent. less than that on the fixed cone, the rotating cone would turn 20 percent. faster than twice that of the ball-retainer, as may be computed from the formula by substituting 1.10R for r.

Therefore, pressure leftward on drum "2d" squeezing balls "3A" between the cones "2m" and "3C", will cause drum "2d" and the shaft "E" to turn slower than the speed of the main drive shaft "D".

The gearing between teeth "2k" on drum "2d" and the teeth on gear "2b" will turn the latter slower than shaft "2c", the gear and shaft "2c" both rotating in the same direction. Gear "2b" turns on threads "3K" which causes axial movement of gear "2b" and thrust journal "2u" along shaft "2c", the direction of threading producing movement towards the right, moving sliding bar "2y" also toward the right for preceding conditions. Hence, the operating pressure on sliding bar "2y" must be continuously maintained as it continues to move. Immediately on cessation of the pressure, the balls "3A" will slip between the cone surfaces and under-speeding of cone "3C" and drum "2d" ceases. Obviously, as the under-speeding continues, the longitudinal motion of threaded gear "2b" to the right also continues, hence, the wide face of gear "2b," providing sufficient length of teeth for maintaining teeth "2b" and "2k" in mesh, as gear "2b" moves axially, within the limits of construction of the mechanism.

An exactly similar operation attends pressure against control bar "2y" in an opposite direction or towards the left. This forces cone "2s" on sleeve "2t" in the opposite direction or to the right, clamping balls "3B" between the rotatable cone "2s" and point of contact "3E" on the cooperating fixed cone. The conditions of operation are identical with those before described for balls "3A", and the cones between which they work. But in this second case the radius of the path of ball contact around the rotatable cone "2s" is less than the corresponding radius on the fixed cone at "3E". Therefore, according to well-known gearing relationships, and the equation previously given herein, cone "2s" will turn faster than shaft "D". Since cone "2s" is fastened to shaft "E", this latter shaft will run at a similarly greater speed. This produces rotation of main gear "83" with respect to the housing "C" of the propeller blade-ends, and in a direction opposite to that in which the gear "83" turns when the speed of shaft "E" is less than that of shaft "D" and before explained.

Hence, thrust of control bar "2y" in one direction will cause rotation of the propeller blades in a corresponding direction, and thrust on bar "2y" in the opposite direction produces rotation of the propeller blades in correspondingly opposite direction. And relative motion between shafts "D" and "E" is attended with axial motion of gear "2b" and thrust journal "2u" in one or the other direction, causing motion of control-bar "2y" in the direction in which it is urged by manual or other control. Obviously, an operating handle with scale and pointer similar to those parts shown in Figs. 4 and 5, or of any other convenient form of control, can be applied or connected to sliding bar "2y" or directly to lever "2w". Clearly, the difference in speed between shafts "D" and "E" will depend on the pressure applied to thrust the cooperating cones together. There will always be some slip between the balls "3A" and the cones on each side thereof, and the less the slip, the greater will be the change in speed of shaft "E" up to the maximum limit of the design of mechanism employed. Hence, the direction and speed of control are always directly in the control of the operator.

As has been explained, difference in speed, or relative rotation, between shaft "D" and shaft "E" will cause gear "83" to turn relative to the propeller casing "C", and, thereby, through the gearing described, turn the propeller blades to change their pitch. If the speed of shaft "E" be greater than that of shaft "D", the pitch change will take place in one direction, while if shaft "E" turns at a lower speed, the propeller blades will be constrained to rotate in the opposite direction, so that by appropriate shaft speed-changing devices, as before described, the propeller pitch may be changed in either direction.

Returning to Figs. 1, 2 and 3 for explanation of details therein shown, "2a" is a gear mounted on shaft "D" and indicative that power is applied to the main drive shaft "D" intermediate the propeller casing "C" and the control mechanism shown in Fig. 4, just as explained in description of Figs. 7, 8 and 9. "10" and "10" are circular end cover plates for casing "C", having enlarged central openings "22" is a central hub extending longitudinally through casing "C" and splined to shaft "D" at "25", as shown. "12" is a rear circular dished cover plate to close the opening in rear cover plate "10", while "12a" is a similar plate to cover the opening in forward cover plate "10". Hub "22" is conically counterbored at its ends. Conical end members, fixed to the shaft "D" and threaded to screw into position and for adjustment, are provided, the front one "G", having a sleeve which screws into a threaded portion interior of shaft "D", and the rear cone, "F", is threaded over shaft "D" as shown. This arrangement provides for exact location of the propeller casing along the length of shaft "D" and its exact centering and adjustment.

End cover caps, "13", having a bore to fit the metal socket on the stub end "A" of the propeller blade or in some cases, the extended sleeve "B" which caps are threaded to screw on the end of socket "14" at the end of section "30" thereof, and are provided to hold any lubricant and exclude dust and dirt from the casing. These caps also provide holding shoulders for rings "38a". In practice, projecting parts of the metal socket fastened on stub end "A" as the shouldered ring "19" and the adjacent flange, are of slightly less diameter than the bore of cap "13". In cases where the blade end is small and the flanged parts of the metal socket therefor are to large for the bore of the cap "13" to pass over, the latter is placed over the stub end of the blade before the metal socket is mounted in place.

Having described my invention in connection with illustrative embodiments, forms and arrangements of parts, it will be understood that many variants thereof are possible to those skilled in the art, and my invention, in its broader aspects, is not limited to the particular construction or application herein shown and described, as changes in the size, proportions, configurations, arrangements, assemblage, interaction, juxtaposition and mechanical relations, as well as additions, omissions, substitutions, combinations and alterations of forms, parts, members, features and in the kind and order of operations, and successive steps, may be made without departing from the broad spirit of this invention.

I claim as my invention:

1. In a propeller system, the combination of power means for changing the propeller blade pitch, and control means for said power means, said control means being adapted to move responsive to change in pitch of said propeller blades.

2. In a propeller adapted for changing the pitch of a blade, the combination of power means for moving a propeller blade for said pitch variation, and control means for said power means, which control means is adapted to move in accordance with change in propeller blade pitch.

3. In a propeller adapted to have a blade rotated about a longitudinal axis, the combination of power means for turning said blade, and manual control means for said power means, said control means being adapted to move responsively to movement of said blade and to indicate the pitch position thereof.

4. In a pitch-changing means for a propeller blade, the combination of a power source; a housing carrying a socket for the blade end; means whereby the propeller blade is rotated axially in said socket by said power source; control means for actuating said blade-rotating means by said power source, including a manual element which is moved with said blade-rotating means.

5. In a propeller adapted for blade pitch change, the combination of a blade rotatably socketed to turn about its longitudinal axis; power means for turning said blade, and manual control means for said power means, said control means being adapted to move responsively to movement of said power turning means and to indicate by its position, the pitch position of the said blade.

6. In a propeller propulsion system, the combination of a power source; a power shaft; a propeller blade adapted to be rotated around its longitudinal axis, for variation in pitch; power drive means for rotating said blade about said axis; a control shaft for communicating power from said power source to said power-driven blade-turning means, by production of relative motion between said control shaft and said power shaft; and manual control for said power blade-turning means, the position whereof changes progressively with change in position of the blade.

7. In a propeller propulsion system, the combination of a power source; a hollow power shaft; a propeller blade adapted to be rotated around its longitudinal axis, for variation in pitch; power drive means for rotating said blade about said axis; a control shaft interior of and concentric with said power shaft for communicating power from said power source to said power-driven blade-turning means, by production of relative motion between said control shaft and said power shaft; and manual control for said power blade-turning means, the position whereof changes progressively with change in position of the blade and at any time indicates the pitch setting of the blade.

8. In a propeller system, the combination of a propeller having blades rotatable around their longitudinal axes; a power source; driving means between the propeller and the power source; power means for rotating said blades; control means for said power means, whereby power from said power source is communicated to said power means, said control means being connected with said power means to move responsive to the rotation of said blades.

9. In a propeller system adapted to have the pitch of its blades changed by rotation around their axes, the combination of a hollow power drive shaft for the propeller; means for actuating the rotation of propeller blades for pitch change, a power-driven control shaft passing through said hollow power drive shaft, and adapted to operate said propeller blade rotating means, and to produce movement of said blade rotating means when relative motion between the two said shafts is produced, and control means for causing said relative motion.

10. In a propeller system adapted to have the pitch of its blades changed by rotation around their axes, the combination of a hollow power drive shaft for the propeller; means for actuating the rotation of propeller blades for pitch change, a power-driven control shaft passing through said hollow power drive shaft, and adapted to produce movement of said blade-rotating means when relative motion between the two said shafts is produced; control means for producing said relative motion, and manual means whereby power is applied to said control means, which manual means move responsive to the degree of change in blade pitch and the position whereof at any time indicates the blade pitch.

11. In a pitch changeable propeller system, the combination of a source of power; a hollow drive-shaft extending therefrom to a propeller housing; sockets formed in the said housing adapted to receive and hold rotatably the ends of the propeller blades, means adjacent said housing connected with said propeller blades ends whereby rotation of the propeller blades is produced when relative motion takes place between said means and said housing; a pitch control shaft connected with said blade-moving means and extending therefrom through said hollow shaft and actuating means in the vessel driven by the propeller, adapted to move said control shaft.

12. Actuating means whereby a control shaft is power-driven in either of two directions, including a power source; friction means adapted to cause motion of the said control shaft by said power source when pressure is exerted thereon in either of two directions, manual means for applying pressure to said friction means and adapted to move responsive to the motion of said control shaft, said friction means being continuously operative while pressure is applied thereto.

13. Actuating means whereby a control shaft is power-driven in either of two directions, including a power source; friction means adapted to cause motion of the said control shaft by said power source when pressure is exerted thereon in either of two directions, manual means for applying pressure to said friction means and adapted to move responsive to the motion of said control shaft, said friction means being continuously operative while pressure is applied thereto, the position of said manual pressure-applying means indicating the position of said control shaft.

14. Actuating means whereby a control shaft is power-driven in either of two directions, including a power source; friction means adapted to cause motion of the said control shaft by said power source when pressure is exerted thereon in either of two directions, manual means for applying pressure to said friction means and adapted to move responsive to the motion of said contol shaft, said friction means being continuously operative while pressure is applied thereto, the speed of movement of said shaft being proportional to the said manually applied pressure.

15. Actuating means for driving a control shaft in either of two opposite directions, including a power source; friction means adapted to cause motion of the said control shaft by said power source when pressure is exerted thereon in either of two directions, manual means for applying pressure to said friction means and adapted to move responsive to the motion of said control shaft, the direction of motion of said shaft corresponding with the direction of pressure applied to said friction means.

16. Actuating means for driving a control shaft in either of two opposite directions, including a power source; friction means adapted to cause motion of the said control shaft by said power source when pressure is exerted thereon in either of two directions, manual means for applying pressure to said friction means and adapted to move responsive to the motion of said control shaft, the direction of motion of said shaft corresponding with the direction of pressure applied to said friction means; the speed of motion of said shaft being proportional to the said pressure manually exerted.

17. In a power driving mechanism, and a power driven control therefor, the combination of a hollow main power shaft, a control shaft inside said main shaft, manual control means for causing relative motion between the two said shafts by application of pressure, said manual means being moved by said control shaft and in the direction of said pressure.

18. In a power driving mechanism and power control means, the combination of a hollow power drive shaft, an internal control shaft, both whereof are normally adapted to rotate at identical speeds; friction gearing means between said shafts adapted to be operated by pressure, whereby said power control shaft is caused to move at a speed differing from that of said power drive shaft, a manual control for application of said pressure to said friction gearing; a member adapted to move responsive to relative motion between the two said shafts, said member being connected to said manual means so that the manual means is moved responsive to relative motion between said shafts and in the same direction as that of the pressure exerted by said manual means, so that the manual pressure must be continually maintained for continuous relative motion between the said shafts, said relative motion causing operation of said control means.

19. In a manually controlled power drive, the combination of a power-operated shaft; an externally driven rotating member; frictional gearing between said shaft and said rotating member adapted to be engaged by application of pressure; a third member adapted to move responsive to the direction and degree of movement of said shaft; a manual control for applying pressure on said frictional gearing and connected with said third member so that said manual control means is moved responsive to said motion of the third member, and in the same direction as that of the applied pressure.

20. In a manually controlled power drive mechanism, the combination of a power drive shaft; friction drive means for changing the speed of said shaft; manual pressure means for causing engagement of said friction drive means; a member adapted to move responsive to movement of said shaft; connections from said member to said manual means whereby said manual means are moved responsive to movement of said shaft and in a direction to relieve pressure applied to said friction drive means so that said manual friction drive means requires continuous movement for continuous movement of said shaft, and the position of said manual means indicates the position of said shaft.

21. In a manually controlled power transmission mechanism for producing longitudinal motion of a shaft, the combination of a source of power, a shaft rotated thereby; a member splined on said shaft; a pinion rotatably fastened on a projecting portion of said member whereby said pinion is revolved about said shaft; a pair of co-facing bevel gears on said shaft free to rotate and meshing with said pinion, so that both gears normally rotate with said shaft; oppositely threaded sleeves fastened to said gears, each cooperating with a correspondingly threaded portion of said shaft; friction means whereby either of said gears may be partly arrested, so that relative motion between said sleeves in opposite directions, and consequent axial motion of the shaft, is produced, and manual pressure means connected with said friction means and with the said shaft, so that the manual control travels with longitudinal shaft motion and in the same direction as that of the manually applied force.

22. In a power driven manually controlled operating mechanism, the combination of a control shaft; a second shaft; pressure-operated gearing between said shafts whereby the speed of said control shaft is varied; a member adapted to move responsive to the speed difference between said shafts; manual control means connected with said pressure-operated gearing and said member, whereby pressure on said manual means causes relative motion between said two shafts and corresponding motion of said manual means, the direction of the pressure applied fixing the direction of said relative motion.

23. In a power driven manually controlled operating mechanism, the combination of a control shaft; a second shaft; pressure-operated gearing between said shafts whereby the speed of said control shaft is varied; a member adapted to move responsive to the speed difference between said shafts; manual control means connected with said pressure-operated gearing and said member, whereby pressure on said manual means causes relative motion between said two shafts and corresponding motion of said manual means, the direction of the pressure applied fixing the direction of said relative motion, said motion tending to relieve said manually-applied pressure, so that said manual control means travels responsive to the speed difference between the said shafts and indicates the position to which said control shaft has moved.

24. In a manually controlled power shaft, the combination of an externally driven pressure-operated gearing for driving said shaft, a manual pressure-applying member, and connecting means between said shaft and said manual member adapted to relieve applied pressure with shaft motion.

25. In a manually controlled power shaft, the combination of an externally driven pressure-operated gearing for driving said shaft, a manual pressure-applying member, and connecting means between said shaft and said manual member adapted to relieve applied pressure with shaft motion, requiring that said manual member follow the movement of said shaft for a predetermined movement of the shaft.

26. In a manually controlled power shaft; pressure-operated means for causing movement of said shaft from an external power source; pressure applying means for said pressure-operated means; pressure relieving means connected with said power shaft; and manual control means operatively connected with said pressure-applying and relieving means.

27. In a power control means for changing adjustments in extraneous mechanisms, the combination of a control shaft; manual control means for governing motion of said shaft operatively connected with said shaft and adapted to move responsively to the motion of said shaft.

28. In a manually controlled power transmitting apparatus, the combination of a source of power; a shaft adapted to move in either of two opposite directions; connections between said source of power and the shaft whereby the shaft is moved when said connections are appropriately actuated; manual control means for actuating said connections and adapted to be moved in either of two opposite directions, and thereby to cause corresponding motion of the said shaft; means connected with said shaft and with said manual control means adapted to move responsive to motion of the said shaft and to move said manual control in a direction to cause said shaft-driving connections to become inoperative, thereby requiring continuous movement of said manual control means during movement of said shaft.

29. In a power control, the combination of driving means; a shaft; actuating means whereby said driving means is caused to move said shaft; manual control means for said actuating means; a member adapted to move responsive to movement of said shaft and connected with said manual control means, whereby said manual means are also moved responsive to movement of said shaft, the said members being coordinated to so move that motion of said shaft renders said control means inoperative.

30. In a propeller system, the combination of power means for changing the propeller blade pitch, and control means for said power means, said control means being adapted to move responsive to change in pitch of said propeller blades, and to indicate the pitch thereof.

31. In a propeller adapted for changing the pitch of a blade, the combination of power means for moving a propeller blade for said pitch variation, and control means for said power means, which control means is adapted to move in accordance with change in propeller blade pitch and means for indicating pitch.

In testimony whereof, I have signed my name to this specification at Los Angeles, Calif., this 29th day of October, 1930.

HARDING F. BAKEWELL.